United States Patent
Lin et al.

(10) Patent No.: US 6,917,520 B2
(45) Date of Patent: Jul. 12, 2005

(54) FIXING DEVICE FOR DATA STORAGE APPARATUS

(75) Inventors: Wan Cheng Lin, Tu-Chen (TW); Li Yun Gan, Shenzhen (CN); Lusheng Li, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 308 days.

(21) Appl. No.: 10/141,388

(22) Filed: May 7, 2002

(65) Prior Publication Data
US 2003/0198012 A1 Oct. 23, 2003

(30) Foreign Application Priority Data
Apr. 17, 2002 (CN) .......................................... 02227007

(51) Int. Cl.⁷ ................................................. G06F 1/16
(52) U.S. Cl. ........................ 361/685; 361/683; 248/917; 369/247
(58) Field of Search .................................. 361/684–686, 361/724–728, 747, 759; 360/97.01, 97.02, 98.01; 248/685, 693, 696, 204, 205.1, 300, 309.1, 635; 312/223.2, 332.1; 369/247, 263; 267/136, 140.3, 158, 175, 177, 152, 166

(56) References Cited

U.S. PATENT DOCUMENTS

| | | | | |
|---|---|---|---|---|
| 4,812,932 A | * | 3/1989 | Hishinuma et al. | 360/97.01 |
| 5,029,026 A | * | 7/1991 | Stefansky et al. | 360/97.02 |
| 5,035,396 A | * | 7/1991 | Krum et al. | 248/635 |
| 5,124,855 A | * | 6/1992 | Dew et al. | 360/97.02 |
| 5,131,619 A | * | 7/1992 | Daugherty et al. | 248/635 |
| 5,668,791 A | * | 9/1997 | Yamada et al. | 369/247 |
| 6,130,817 A | * | 10/2000 | Flotho et al. | 361/685 |
| 6,233,140 B1 | * | 5/2001 | Cummings et al. | 361/683 |
| 6,249,504 B1 | * | 6/2001 | Iwanaga | 369/247 |

FOREIGN PATENT DOCUMENTS

JP 402061882 A * 3/1990 ........... G11B/33/08

* cited by examiner

Primary Examiner—Michael Datskovsky
(74) Attorney, Agent, or Firm—Wei Te Chung

(57) ABSTRACT

A fixing device (1) for securing a data storage apparatus (50) in a mounting bracket (40) includes a screw (10), a grounding plate (20), and a spring gasket (30). The screw includes a head (12), a connection portion (15), and an engaging portion (16). The spring gasket includes a cap (32) and a body (34). The grounding plate and the spring gasket surround the connection portion. The engaging portion is extended through one through hole (44) of a side panel (42) of the mounting bracket to engage with the data storage apparatus. The cap is sandwiched between the head and the mounting bracket, for absorbing shock. The body is received in the through hole and is compressed between the screw and the mounting bracket, for absorbing shock. Grounding fingers of the grounding plate resiliently abut against the side panel, for forming grounding paths.

14 Claims, 3 Drawing Sheets

FIXING DEVICE FOR DATA STORAGE APPARATUS

BACKGROUND OF THE INVENTION

1. Field of the Invention

The present invention relates to fixing devices, and particularly to fixing devices for securing data storage apparatuses in computers.

2. Related Art

Various data storage apparatuses are installed in computers for communication and handling of data. Such apparatuses include, for example, hard disk drives, floppy disk drives and CD-ROM drives.

Conventionally, a data storage apparatus is directly installed in a mounting bracket of a computer with bolts. The combined mounting bracket and the data storage apparatus is then attached to a computer enclosure. Gaps unavoidably exist between the bolts and the mounting bracket.

The data storage apparatus stores and retrieves large amounts of information that can be accessed in milliseconds. When the computer is subjected to shock, the data storage apparatus sustains shock relative to the mounting bracket as a result of the gaps that exist between the bolts and the mounting bracket. Such shock can magnify the shock acting on the computer. In addition, the data storage apparatus normally generates static charges during operation, and the static charges accumulate on an outer casing of the data storage apparatus. The accumulated static charges cannot be effectively dissipated to ground as a result of the gaps that exist between the bolts and the mounting bracket. Shock and accumulated static charges would prevent the data storage apparatus from storing or retrieving information properly.

The present invention provides an improved fixing device which overcomes the above problems.

SUMMARY OF THE INVENTION

An object of the present invention is to provide a fixing device which comprises a spring gasket for absorbing shock and thereby reducing the risk of damage to a data storage apparatus.

Another object of the present invention is to provide a fixing device which comprises a grounding plate for forming grounding paths for a data storage apparatus.

To achieve the above-mentioned objects, a fixing device in accordance with the present invention for securing a data storage apparatus in a mounting bracket comprises a screw, a grounding plate and a spring gasket. The grounding plate has a plurality of elastic grounding fingers. The spring gasket comprises a cap and a body. The screw comprises ahead, a connection portion, and an engaging portion. The grounding plate and the spring gasket surround the connection portion of the screw. The engaging portion of the screw is extended through one through hole of a side panel of the mounting bracket to engage in a corresponding screw hole of the data storage apparatus which is received in the mounting bracket. The cap of the spring gasket is sandwiched between the head of the screw and the mounting bracket, for absorbing shock and thereby reducing the risk of damage to the data storage apparatus. The body of the spring gasket is received in the through hole and is compressed between the screw and the mounting bracket, for absorbing shock and thereby reducing the risk of damage to the data storage apparatus. The grounding fingers of the grounding plate resiliently abut against the side panel, for forming grounding paths between the data storage apparatus and the mounting bracket.

Other objects, advantages and novel features of the present invention will be drawn from the following detailed description of the preferred embodiment of the present invention with attached drawings, in which:

DESCRIPTION OF THE PREFERRED EMBODIMENT

Figure 1:
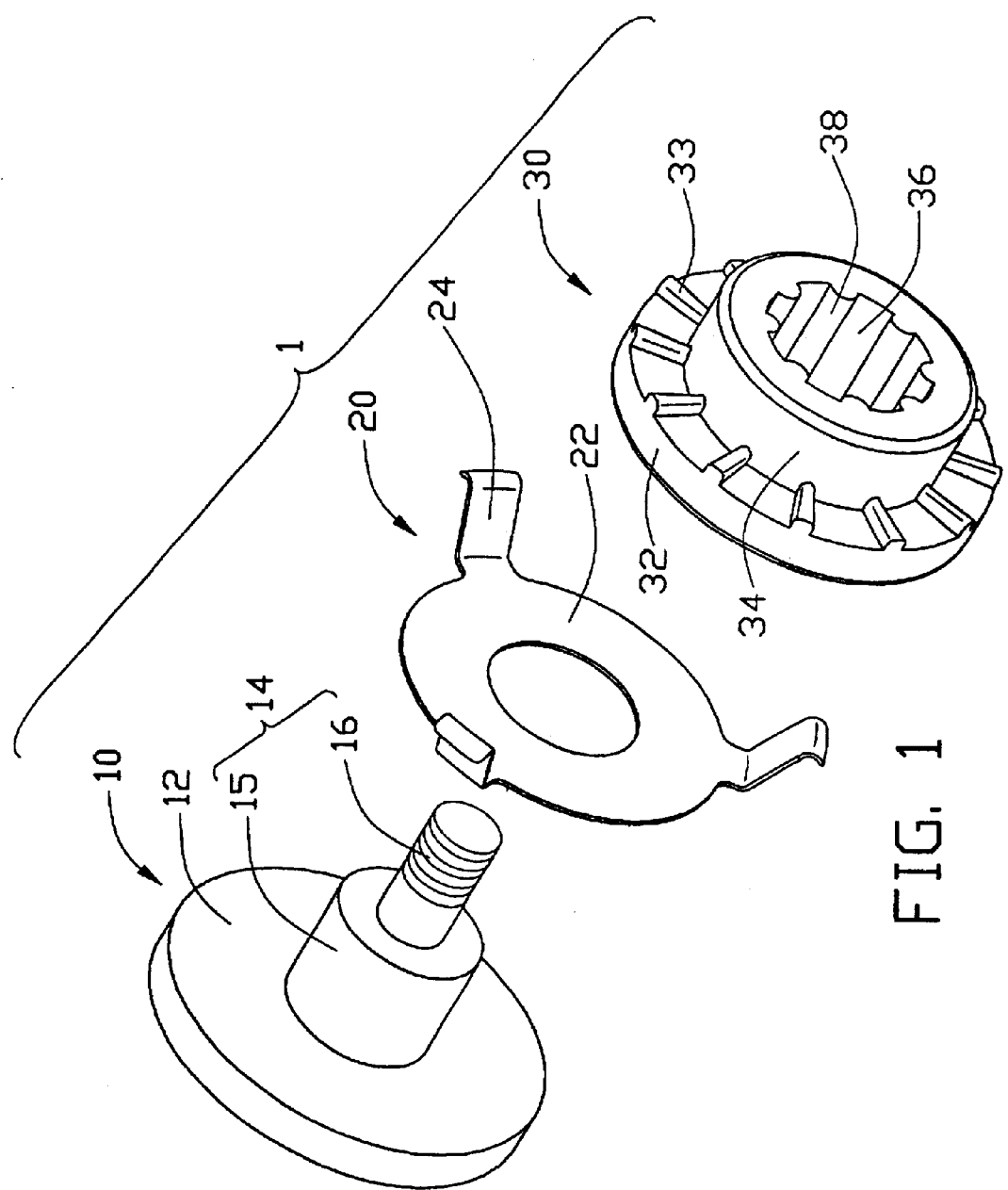
FIG. 1 is an exploded perspective view of a fixing device in accordance with the present invention.

Referring to FIG. 1, a fixing device 1 in accordance with the present invention comprises a screw 10, a grounding plate 20 and a spring gasket 30.

The screw 10 comprises a head 12, and a screw rod 14 extending from the head 12. The screw rod 14 comprises a connection portion 15 and an engaging portion 16. A thread is formed on the engaging portion 16 from a middle portion thereof to a free end thereof. A diameter of the connection portion 15 is larger than a diameter of the engaging portion 16. The grounding plate 20 comprises a base 22 and a plurality of evenly spaced grounding fingers 24 extending outwardly from a peripheral edge of the base 22. A first opening 26 is defined through a middle portion of the base 22.

The spring gasket 30 comprises a round cap 32 and a round body 34 integrally extending from the cap 32. A plurality of evenly spaced first ribs 33 is integrally formed on an annular face of the cap 32 that is nearest the body 34. The ribs 33 are also integrally joined with an outer circumferential surface of the body 34, such that they radially extend from the outer circumferential surface of the body 34. A second opening 36 is defined through a middle portion of the spring gasket 30. A plurality of evenly spaced second ribs 38 is formed on an inner circumferential surface of the spring gasket 30. The second ribs 38 are parallel to a central axis of the spring gasket 30, and perpendicular to the first ribs 33.

Figure 2:
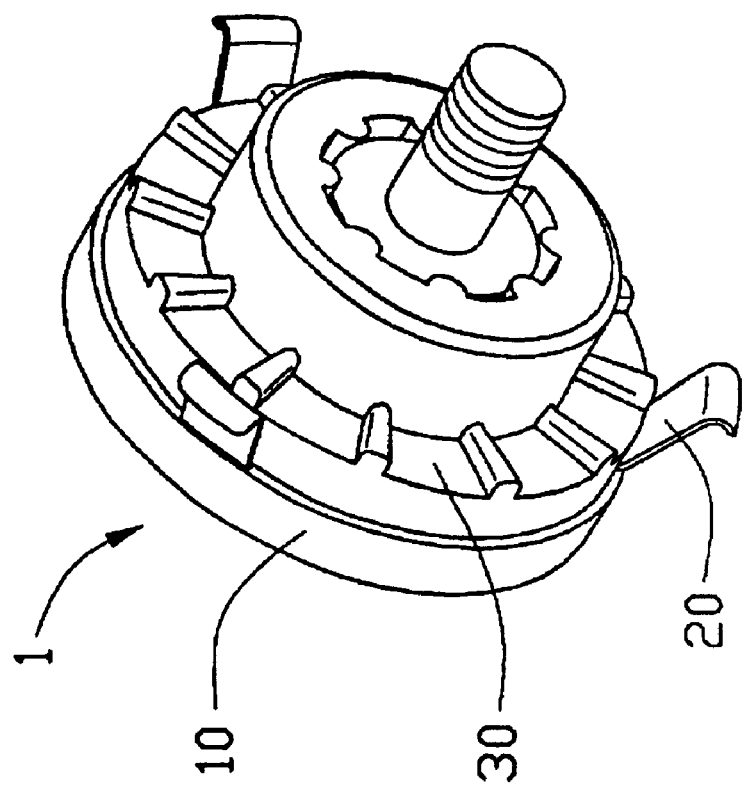
FIG. 2 is an assembled view of FIG. 1.

Referring also to FIG. 2, in assembly of the fixing device 1, the screw rod 14 is sequentially extended through the grounding plate 20 and the spring gasket 30. The grounding plate 20 and the spring gasket 30 surround the connection portion 15 of the screw 10. The base 22 of the grounding plate 20 is sandwiched between the head 12 and the cap 32 of the spring gasket 30.

Figure 3:
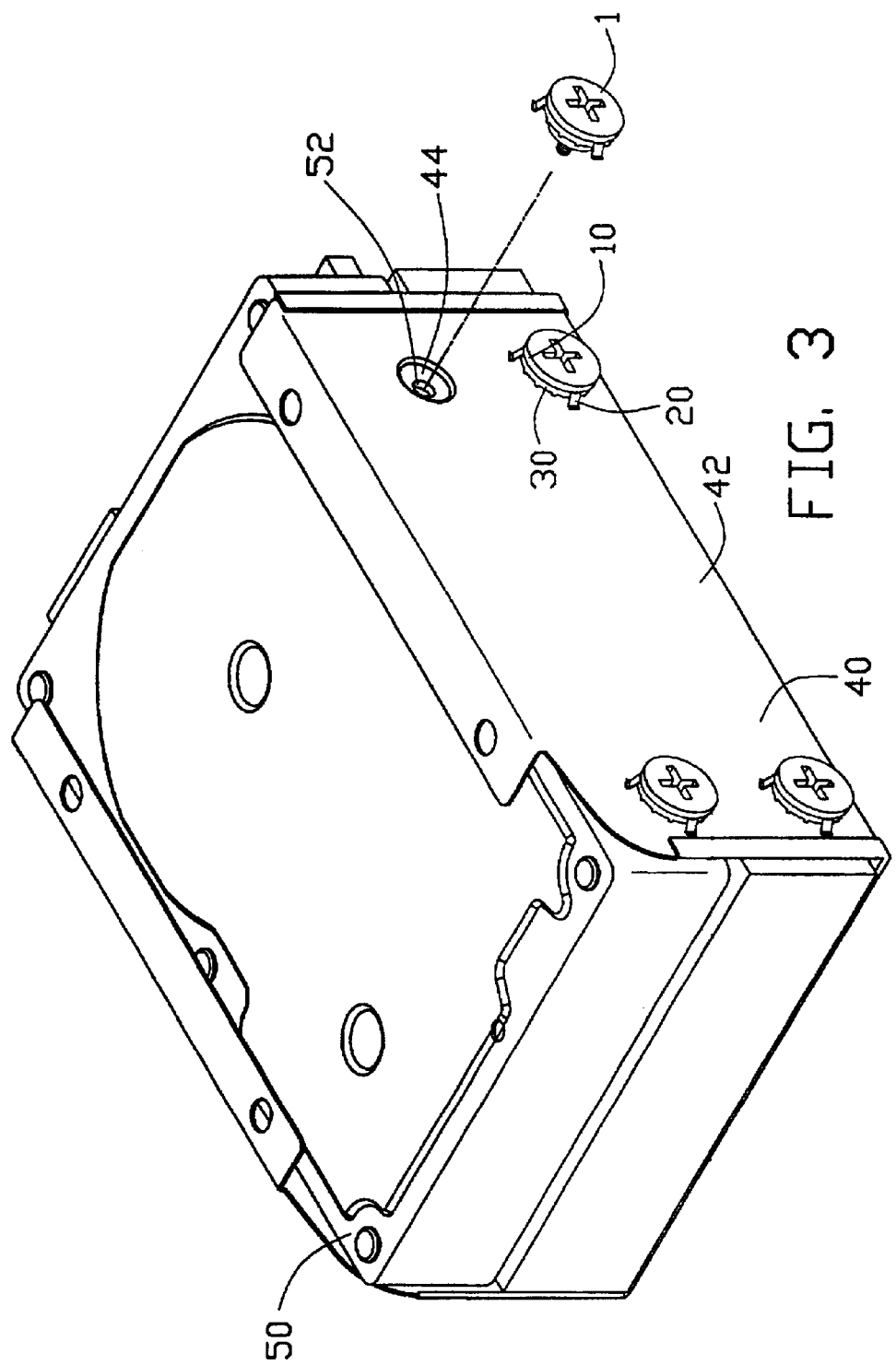
FIG. 3 is a perspective view of a plurality of the fixing devices securing a data storage apparatus in a mounting bracket.

FIG. 3 shows a plurality of fixing devices 1 to secure a data storage apparatus 50 in a mounting bracket 40. The data storage apparatus 50 defines two pairs of screw holes 52 in each of opposite sidewalls thereof. The mounting bracket 40 comprises a pair of side panels 42. Each side panel 42 defines two pairs of through holes 44, corresponding to the screw holes 52 of the data storage apparatus 50. A diameter of each through hole 44 is slightly less than an outer diameter of the body 34 of the spring gasket 30. In assembly, the data storage apparatus 50 is received in the mounting bracket 40. One fixing device 1 is then attached to the mounting bracket 40. The engaging portion 16 of the screw 10 of the fixing device 1 is extended through one of the through holes 44 of the mounting bracket 40 to engage with the data storage apparatus 50 in the corresponding screw hole 52 thereof. The connection portion 15 of the screw 10 abuts the corresponding sidewall of the data storage apparatus 50, for preventing excessive movement of the screw 10 into the data storage apparatus 50. The data storage apparatus 50 is thereby protected from being damaged by the screw 10. The body 34 of the spring gasket 30 is received in the through hole 44 of the mounting bracket 40, and is compressed between the connection portion 15 and the side panel 42 of the mounting bracket 40. The second ribs 38 of the spring gasket 30 abut against an outer circumferential surface of the connection portion 15, for absorbing shock and thereby reducing the risk of damage to the data storage apparatus 50. The first ribs 33 abut the side panel 42 of the mounting bracket 40, for absorbing shock and thereby reducing the risk of damage to the data storage apparatus 50. The grounding fingers 24 resiliently abut against the side panel 42, for forming grounding paths between the data storage apparatus 50 and the mounting bracket 40. Similarly, the other fixing devices 1 are attached to secure the data storage apparatus 50 and the mounting bracket 40 together.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A fixing device assembly for a storage apparatus, the storage apparatus defining a plurality of screw holes therein, the fixing device assembly comprising:
    a mounting bracket for installing the storage apparatus therein, the mounting bracket defining a plurality of through holes corresponding to the plurality of screw holes of the storage apparatus; and
    a plurality of fixing devices each comprising a screw and a spring gasket, the spring gasket comprising a body, wherein
        each of the screws extends through one corresponding through hole of the mounting bracket to engage in one corresponding screw hole, and the body of each of the spring gaskets is received in the corresponding through hole and is compressed between the screw and the mounting bracket for absorbing shock, and wherein
        each of the screws comprises, a grounding plate is sandwiched between the head and the spring gasket, and the grounding plate comprises a plurality of grounding fingers for electrically contacting the mounting bracket.

2. The fixing device assembly as claimed in claim 1, wherein each of the screws further comprises a connection portion for abutting a surface of the storage apparatus and thereby limiting excessive movement of the screw into the data storage apparatus, and an engaging portion for engaging with the storage apparatus in the corresponding screw hole thereof.

3. The fixing device assembly as claimed in claim 2, wherein the body of the spring gasket surrounds the connection portion.

4. The fixing device assembly as claimed in claim 1, wherein the spring gasket further comprises a cap, a plurality of first ribs is formed on a face of the cap proximate the body, and the plurality of first ribs abuts the mounting bracket.

5. The fixing device assembly as claimed in claim 2, wherein the spring gasket defines a through opening receiving the connection portion of the screw, and a plurality of second ribs is formed on an inner circumferential surface of the spring gasket.

6. The fixing device assembly as claimed in claim 1, wherein a diameter of each of the through holes is slightly less than an outer diameter of the body.

7. A fixing device for a storage apparatus received in a mounting bracket, the fixing device comprising:
    a screw comprising a head, an engaging portion for engaging with the storage apparatus, and a connection portion connected between the head and the engaging portion for limiting excessive movement of the screw into the storage apparatus, a diameter of the connection portion being greater than a diameter of the engaging portion; and
    a spring gasket surrounding the connection portion of the screw, the spring gasket comprising a body for being compressed between the screw and the mounting bracket, wherein
        the spring gasket further comprises a cap, a plurality of first ribs is formed on a face of the cap.

8. The fixing device as claimed in claim 7, wherein said face of the cap is proximate the body, and the first ribs radially extend away from an outer circumferential surface of the body.

9. The fixing device as claimed in claim 8, further comprising a grounding plate, wherein the grounding plate surrounds the connection portion of the screw and is sandwiched between the head of the screw and the cap of the spring gasket, and the grounding plate comprises a plurality of grounding fingers for electrically contacting the mounting bracket.

10. The fixing device as claimed in claim 9, wherein the spring gasket defines a through opening receiving the connection portion of the screw, and a plurality of second ribs is formed on an inner circumferential surface of the spring gasket.

11. A storage apparatus assembly comprising:
    a storage apparatus defining a plurality of screw holes;
    a mounting bracket supportably enclosing said storage apparatus, said mounting bracket defining a plurality of through holes in alignment with said corresponding screw holes, respectively, said through holes being diametrically bigger than the screw holes; and
    a plurality of fixing device each including a screw and a gasket assembled together, said gasket being diametrically bigger than the screw; wherein
        thread portions of the screws are inserted into and fastened to the corresponding screw holes, and the gaskets are received within the corresponding through holes for vibration absorption, and wherein said fixing device further includes a grounding plate with grounding fingers resiliently engaged with the bracket for electromagnetic discharge.

12. The assembly as claimed in claim 11, wherein the screw includes a connection portion extending through said gasket.

13. The assembly as claimed in claim 12, wherein the connection portion extends through said grounding plate.

14. The assembly as claimed in claim 11, wherein said grounding plate is sandwiched between said screw and said gasket.

* * * * *